Figure 1:
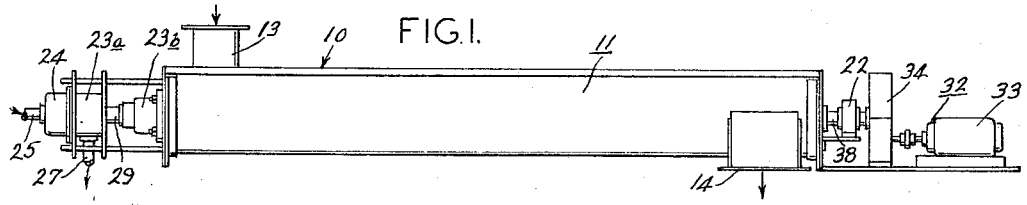

Nov. 15, 1966   W. L. ROOT 3RD   3,285,330
ROTARY PROCESSOR
Filed July 9, 1964   3 Sheets-Sheet 1

INVENTOR:
WILLIAM L. ROOT, 3rd
BY Howson & Howson
ATTYS

Nov. 15, 1966  W. L. ROOT 3RD  3,285,330
ROTARY PROCESSOR

Filed July 9, 1964  3 Sheets-Sheet 2

INVENTOR:
WILLIAM L. ROOT, 3rd.
BY Howson & Howson
ATTYS.

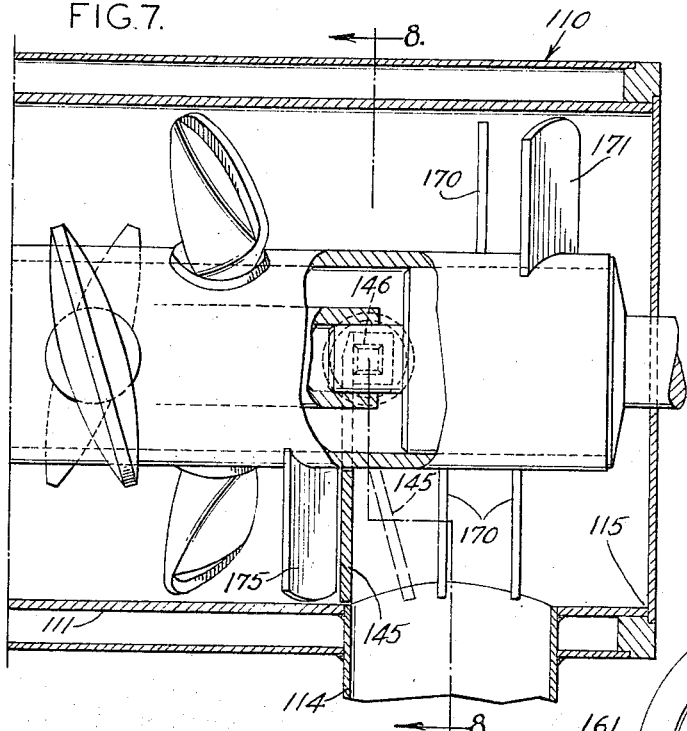
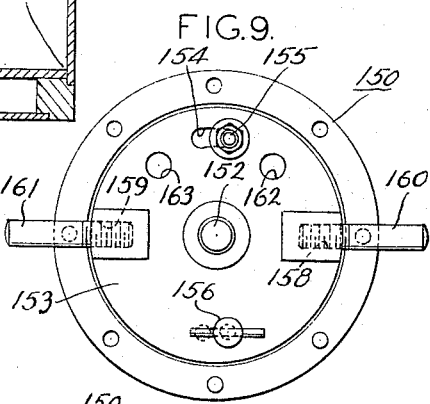
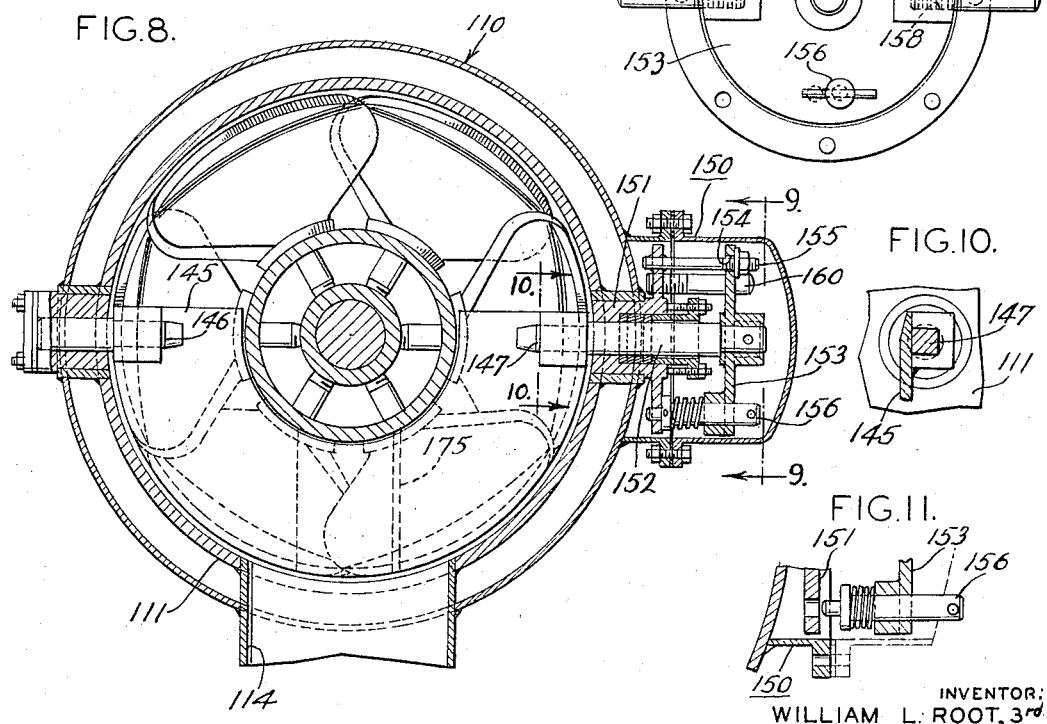
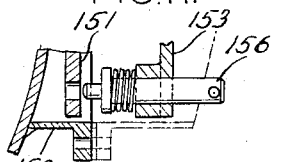

United States Patent Office 3,285,330
Patented Nov. 15, 1966

3,285,330
ROTARY PROCESSOR
William L. Root 3rd, Bethlehem, Pa., assignor to The Bethlehem Corporation, Bethlehem, Pa., a corporation of Pennsylvania
Filed July 9, 1964, Ser. No. 381,475
12 Claims. (Cl. 165—86)

The present invention relates to mixing apparatus and more particularly to rotary mixing apparatus wherein heat is to be indirectly transferred either to or from, as the case may be, the material to be processed.

Although rotary mixing apparatus is old in the art, in recent years there has been a strong trend to incorporate within the mixing apparatus, heat exchange means whereby heat may be added or removed from the material as it is being mixed. The addition or removal of heat from the material being processed has, however, led to other problems of material handling within the processors, such as bulk shrinkage of the material as it is processed. The presence of bulk shrinkage of the material as it is mixed may, dependent upon the material being mixed, cause too rapid a reaction due to the increased exposure of the material to the heat exchange fluid. Various methods and apparatus have been proposed to meet the problem of bulk shrinkage such as the means suggested by the O'Mara Patent No. 3,020,025 wherein hollow paddle elements which receive the heat transfer fluid, are adjustably mounted at various angles on the shaft to compensate for the differences of bulk density as the material commences from the charging inlet to the discharging outlet end of the apparatus. Although this method has advantages, the pitch of the paddles must be set at different angles for each material introduced for mixing. Further, it is difficult to keep the joints wherein the paddles are provided their adjustability, free of the material being mixed and treated.

In view of the above, it is an object of the present invention to provide rotary mixing apparatus wherein heat may be indirectly transferred either to or from the processed material, but which apparatus will be easily adaptable to any kind of material to be mixed and treated while overcoming the deleterious effects of varying bulk density as the material is being processed.

Another object of the present invention is to provide apparatus which may be used in the processes of calcination, chilling, cooking, crystallizing, indirect drying, heating, reaction and solvent recovery.

Still another object of the present invention is to provide apparatus capable of processing liquids, slurries, paste materials and/or solids.

Another object of the present invention is to provide a discontinuous screw conveyor which permits mixing of the material being processed simultaneously with the advance of the material between the inlet and outlet of the apparatus.

Another object of the present invention is to provide apparatus which causes a material build-up adjacent the discharge end of the apparatus thus negativing variations in the bulk density of the material as it is mixed and treated.

Another object of the present invention is to provide apparatus which permits the heat transfer portions of the apparatus to be maintained at the same temperature regardless of their position in the device thus permitting a greater mean-temperature-difference between the material being treated and the heat transfer portions of the mixing apparatus.

Figure 3:
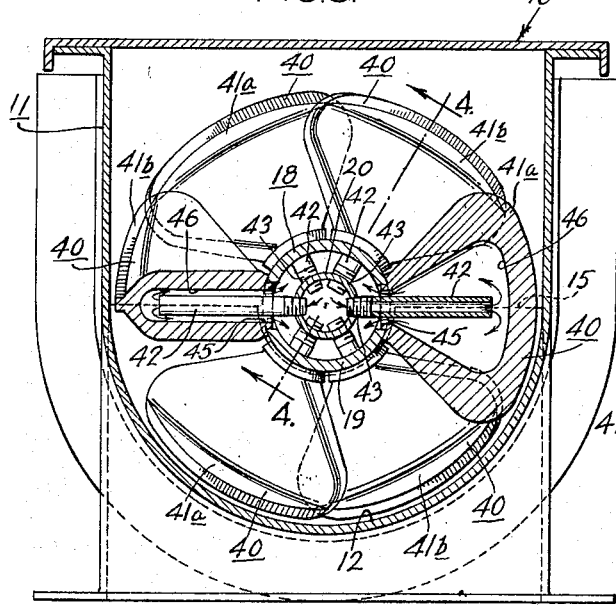
Figure 5:
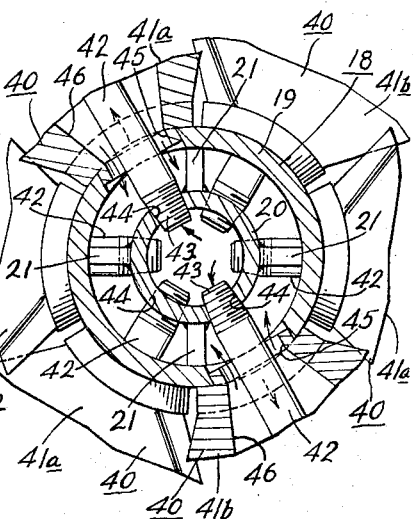
Figure 4:
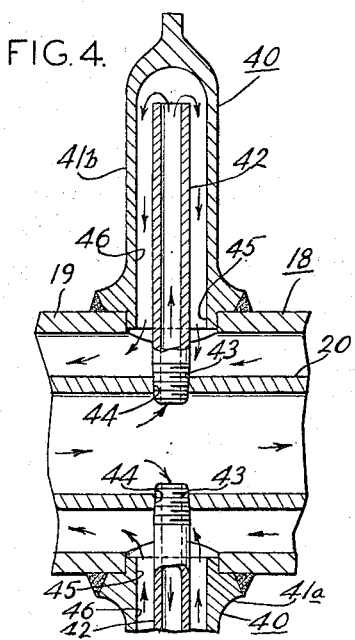
Figure 6:
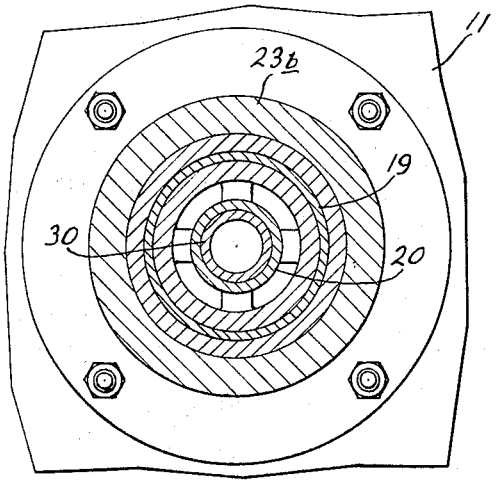
Figure 2A:
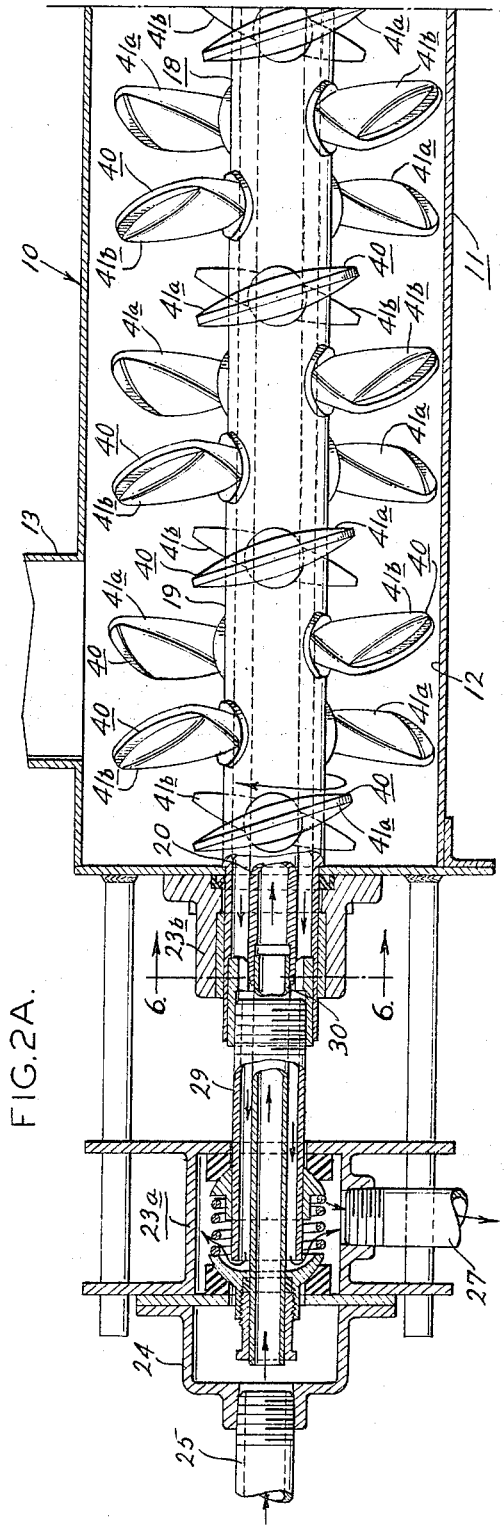
Figure 2B:
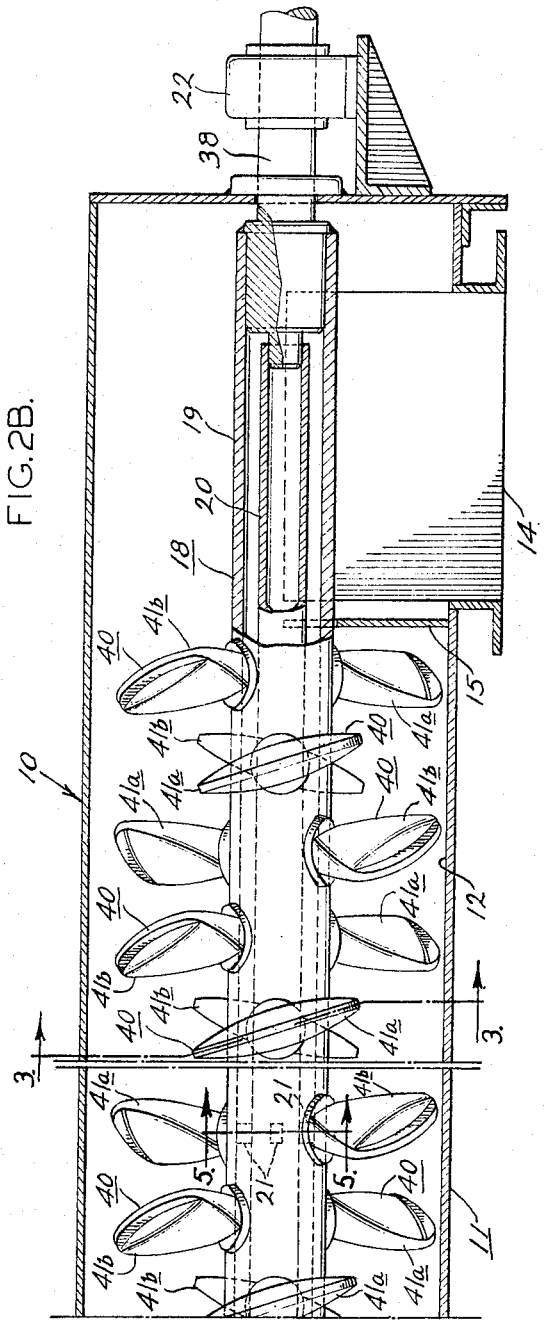

Other objects and a fuller understanding of the invention may be had by referring to the following description and claims taken in conjunction with the accompanying drawings in which:

FIG. 1 is a schematic profile of apparatus embodying the present invention;
FIG. 2A is an enlarged fragmentary sectional view of a portion of the apparatus illustrated in FIG. 1;
FIG. 2B is a fragmentary sectional view of another portion of the apparatus illustrated in FIG. 1 and constructed in accordance with the present invention;
FIG. 3 is an enlarged sectional view taken along line 3—3 of FIG. 2B;
FIG. 4 is an enlarged fragmentary sectional view taken along line 4—4 of FIG. 3;
FIG. 5 is an enlarged fragmentary sectional view of a portion of the apparatus taken along line 5—5 of FIG. 2B;
FIG. 6 is an enlarged fragmentary sectional view taken along line 6—6 of FIG. 2A;
FIG. 7 is a fragmentary sectional view of another embodiment of apparatus constructed in accordance with the present invention;
FIG. 8 is a fragmentary sectional view taken along line 8—8 of FIG. 7;
FIG. 9 is an enlarged fragmentary view taken along line 9—9 of FIG. 8 and with a portion of the apparatus removed;
FIG. 10 is a fragmentary sectional view taken along line 10—10 of FIG. 8; and
FIG. 11 is a fragmentary sectional view of a portion of the apparatus illustrated in FIG. 8, but in a different position.

Referring now to the drawings, and especially FIGS. 1–3, a longitudinally extending heat exchanger-mixer 10 includes a trough or casing 11, the lower inner surface 12 of which is preferably cylindrical and extends the entire length of the apparatus. A charging inlet 13 is provided at one end of the trough 11, in the present instance at the upper portion thereof, and a discharge outlet 14 is provided at the other end of the apparatus, preferably in the lower portion of the trough when the device is mounted wtih its axis horizontal. The charging inlet and discharging outlet 13 and 14 respectively may be connected to conduits or other structures for bringing material to be treated to the heat exchanger-mixer 10 and for conveying it therefrom following the mixing and heat exchange process.

Rotatably mounted within the heat exchanger-mixer 10 is a double hollow shaft assembly 18 comprising an outer shaft 19 and, in the present instance, coaxially mounted therein an inner shaft 20, supported with respect to the outer shaft 19 by a plurality of supports 21 (see FIGS. 5 and 6). As illustrated in FIG. 1, the double hollow shaft assembly 18 is supported at one end by a bearing 22 and at the other end by a rotary coupling 23a and bearing 23b. As illustrated in FIG 2A, the rotary coupling 23a and bearing 23b are provided for fluid communication with the hollow interior of shafts 19 and 20. To this end the interior shaft 20 is coupled to an extension 30 which projects into a portion of the cap 24 of the rotary coupling 23a. The cap portion 24 is connected to a conduit 25 for supplying, in the present instance, a heat transfer fluid to the interior of the shaft 20. Shaft 19 is coupled to an extension 29 which communicates with the annular space between the shafts 19 and 20 and with the interior of the rotary joint's housing, and therethrough with an exterior conduit 27 for discharging the heat transfer fluid. As illustrated in FIG. 1, outboard of the support bearing 22 is drive means 32 comprising, in the present instance, a motor and reduction gears 33 and 34, respectively, connected to an extension 38 of the shaft assembly 18, so as to provide rotation of the double shaft assembly during operation.

In accordance with the invention, a plurality of heat transfer assemblies 40 are disposed at intervals along the double hollow shaft assembly 18 and spaced angularly therearound so as to form a discontinuous screw which mixes the material entering the charging inlet 13 and simultaneously causes the material to be moved longitudinally towards the discharge outlet 14. Further, in order to compensate for differences in bulk density caused by shrinkage of the material as it proceeds from the inlet to the outlet, a weir 15 is placed adjacent the discharge outlet 14.

Each of the heat transfer assemblies 40 of the discontinuous screw, comprises a hollow radially extending blade 41, in the present instance arcuate in outer contour, so as to sweep the lower inner surface 12 of the trough 11 (see FIG. 3), and inclined at an angle to a plane perpendicular to the axis of the shaft assembly 18 in order to effectively move the material being treated longitudinally of the heat exchanger during operation. As may be seen each blade 41 is angularly spaced from its adjacent counterpart so that the blade edge cuts through the material providing maximum heat transfer areas. Each assembly 40 also includes a quill shaft 42 adapted for connection at its inner end, in the present instance a threaded end 43, to an opening 44 in the side wall of the inner hollow shaft 20. A larger opening 45, aligned with the quill shaft opening 44, permits the quill shaft 42 to extend radially of the shaft assembly 18. The larger opening 45 in the shaft 19 allows the blade 41 to fit coaxially with the quill shaft 42, which blade may be secured to the shaft 19 by welding or the like. As best illustrated in FIG. 5, the quill shaft 42 has an external diameter somewhat less than the internal diameter of the hollow blade thus forming an annular space therearound, generally indicated at 46, permitting fluid communication between the blade 41 and the shaft 19. Although heat exchange fluid flow is as illustrated by the arrows in FIGS. 2A and 2B, i.e., through the inner shaft 20, the quill shafts 42, the hollow blade 41, and then through the shaft 19, the flow could just as well be reversed.

The weir 15, located adjacent the discharge outlet 14 is substantially perpendicular to the shaft assembly in the trough 11 and so positioned with respect to the discharge to cause the material being processed to build-up and form a continuously agitated bed of material throughout the mixer 10 and in heat exchange relationship with the heat transfer fluid in the blades 41. As more material is fed to the mixer, the conveyor action of the discontinuous screw causes the material to be discharged over the upper portion of the weir. In the present instance, and as illustrated in FIG. 2B, the weir is fixed to and extends transversely of the trough 11. Further, the weir is arcuate in its lower outline so as to seat against the inner cylindrical surface of the trough 11, while the upper portion terminates at the approximate central axis of the double hollow shaft assembly 18. Although the weir 15 may take many forms, it has been found that a thin sheet of steel, fabricated as above described, is adequate.

As may be noted in FIGS. 2 and 3, the blades 41 of the discontinuous screw are angularly spaced in circumferentially overlapping relation and disposed with their roots on a helix about the shaft assembly. In the present instance there are two sets of blades 41, each set being arranged in a right hand helix with the blades of one set designated 41a, the other set being designated 41b. The helixes are offset 180° from each other. This construction prevents the material from packing or "roping" and facilitates the mixing of the material as it is conveyed from the inlet 13 to the outlet 14. As may be noted, the use of a discontinuous screw in combination with the weir avoids the necessity of speeding up the screw or setting the blades 41 at varying angles along the shaft so as to accommodate changes in bulk density of the material as it is being processed. Further, the heat transfer fluid is in parallel flow through the assemblies rather than concurrent or countercurrent flow. This permits the maintenance of a uniform temperature in the heat transfer assemblies, which thus affords the greatest mean-temperature-difference between the material being processed and the heat transfer fluid. The heat transfer due to the mean-temperature-difference thereby becomes dependent only upon the volumetric flow of the heat transfer fluid.

Oftentimes as different materials are to be processed in the same heat exchanger-mixer, the trough will require cleaning prior to insertion of the new material. In such an event it is desirable to provide a weir that may be movable so that the material being washed out of the trough can be washed beneath the weir and out the discharge outlet. To this end, and in accordance with another embodiment of the invention (see FIGS. 7 and 8), a weir 145 having pivots 146 and 147 respectively may be mounted in a trough 111, adjacent a discharge 114 of a heat exchanger-mixer 110. As illustrated in FIG. 8, the heat exchanger-mixer 110 is of the jacketed type to permit increased heat exchange between the material being processed, although the same principle as hereinafter described is applicable to non-jacketed type mixers such as herein above-described. As is illustrated in FIG. 8, the weir's lower portion is arcuate in outline and coincides with the interior outline of the trough 111. Weir positioning means 150 are provided to move the weir 145 between a closed position and a cleanout position, which positions correspond respectively to the full line and dotted line positions illustrated in FIG. 7.

As illustrated in FIGS. 8, 9, and 11, the weir positioning means 150 comprises a radially flanged sleeve 151 connected to the trough 11 through through which a rotatable shaft 152 extends. Spaced from the sleeve 151 along the pivot shaft 152 is fixed a disk 153 having a slot 154 in the upper portion thereof. The slot 154 accommodates a pivot bolt 155 which is connected to the flanged portion of the sleeve 151. In the lower portion of the weir positioning means 150 is a biased rod 156 which extends between, and locks the disk 153 to the flange of the sleeve 151. When it is desired to move the weir 145 to either its cleanout or its closed position, the rod 156 is moved to the right (see FIG. 11) and disengaged from the arm of the sleeve 151. On either side of the weir securing means 150 are tapped holes 158 and 159 which accommodate handles 160 and 161 for rotating the disk 153, and thereby the weir 145, to the desired position. As a matter of convenience, storage means are provided at 162 and 163 for the handles 160 and 161 respectively.

In the event that the material being discharged is particularly stiff, it may be necessary to provide means on the shaft assembly to prevent the material from clogging the discharge outlet. To this end, and in accordance with another feature of the invention, a plurality of radially extending fingers 170 may be mounted on the shaft assembly and radially aligned with the discharge outlet 114 (see FIG. 7). The fingers 170 may be thin rods, blades or the like having a radial extension sufficient to cause breaking up of the material in the event that the material clogs the discharge outlet 114. Also, in the event that a corner 115 of the trough 111 builds up a quantity of material, a rabbling paddle 171 may be provided on the discharge side of the weir so as to clear the corner 115 of this accumulated material. As illustrated in FIG. 7, the rabbling paddle 171 should be pitched opposite the direction that the blades of the discontinuous screw are pitched so as to cause the material to move out of the corner 115 when the apparatus is in operation.

In certain circumstances it may be desirable to aid the discontinuous screw in moving material over the weir. To this end, a radially extending lifter paddle, in the present instance a flat board 175 or the like, may be added to the shaft, immediately adjacent the weir. It should be noted, however, that the presence of a lifter paddle will change the hydraulic gradient of the material being mixed.

The use to which equipment constructed in accordance with the invention may be put is continuous processing of materials wherein the materials must be treated by either adding or removing heat during the process. Such processess include calcination, chilling, cooking, crystallizing, indirect drying, heating, reactions of various kinds, and/or solvent recovery. The materials which may be processed in equipment constructed in accordance with the present invention include, liquids, slurries, paste materials and/or solids. An example of the use of this equipment would be where reactants are added to the mixer which reactants react upon mixing providing either an endothermic or exothermic reaction with the heat being added or removed respectively through the heat transfer assemblies or, if the heat exchanger is jacketed, also through the mixer walls.

In summary, apparatus such as that heretofore described and constructed in accordance with the present invention will permit mixing of material added thereto while also permitting heat to be indirectly transferred either to or from the processed material, while overcoming the deleterious effects of varying bulk density as the material is being processed.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A heat exchanger-mixer for indirectly treating material comprising an elongated trough having an inlet for charging the trough with material to be treated and an outlet for discharging treated material from said trough, a double hollow shaft assembly comprising a hollow shaft extending longitudinally of said trough and rotatably supported therein, another hollow shaft mounted within said first shaft to define an annular space between said shafts, a plurality of heat transfer assemblies each comprising a radially extending hollow blade connected to one of said shafts and in communication with the interior thereof and a hollow quill shaft extending into said hollow blade, connected to the other of said shafts and in communication with the interior thereof, said assemblies providing thereby parallel heat-transfer fluid paths connecting the interiors of said shafts through said assemblies, each of said blades being permanently and fixedly secured perpendicular to said shafts and angularly set with respect to a plane perpendicular to the longitudinal axis of said shafts so as to form a discontinuous screw between said charging inlet and said discharging outlet, a weir having a substantially arcuate lower portion fittable in said trough transverse to said shafts, adjacent said discharge outlet and mounted with respect to said discharge outlet to cause said material being processed to form a continuously agitated bed of material in heat exchange relationship with the fluid in said hollow blades.

2. A heat exchanger-mixer in accordance with claim 1 wherein said weir is pivotally connected to the interior of said trough, weir positioning means connected to said weir and capable of moving said weir to a position whereby said material being processed is discharged under said weir to said discharging outlet.

3. A heat exchanger-mixer in accordance with claim 1 including radially extending fingers mounted on said shaft assembly radially aligned with said discharge outlet, said fingers having a radial extension sufficient to aid material in said discharge outlet to be continuously discharged through said outlet.

4. A heat exchanger-mixer for indirectly treating material comprising a horizontally disposed, elongated trough having an inlet for charging the trough with material to be treated and an outlet for discharging treating material from said trough, said trough having a lower portion substantially semi-circular in cross section, a double hollow shaft assembly comprising a hollow shaft extending longitudinally of said trough and rotatably supported at either end of said trough, another hollow shaft coaxial with said first shaft and mounted therein to define an annular space between said shafts, a plurality of heat transfer assemblies each comprising a radially extending hollow blade connected to one of said shafts and in communication with the interior thereof and a hollow quill shaft extending into said hollow blade, connected to the other of said shafts and in communication with the interior thereof, said assemblies providing thereby parallel heat-transfer fluid paths connecting the interiors of said shafts through said assemblies, each of said blades being permanently and rigidly secured perpendicular to said double hollow shaft assembly and angularly set with respect to a plane perpendicular to the longitudinal axis of said shafts so as to form a discontinuous screw between said charging inlet and said discharging outlet, said hollow blades having an arcuate outer edge adapted to sweep adjacent said cylindrical surface during rotation of the shaft assembly in said trough, a planer weir having a substantially arcuate lower portion fittable in said trough transverse to said shafts, adjacent said discharge outlet and mounted with respect to said discharge outlet to cause said material being processed to form a continuously agitated bed of material in heat exchange relationship with the fluid in said hollow blades.

5. A heat exchanger-mixer in accordance with claim 5 wherein said blades of said discontinuous screw are angularly spaced in circumferentially overlapping relation and disposed with their root portions on a helix about said shaft.

6. A heat exchanger-mixer in accordance with claim 5 wherein said radially extending hollow blades are mounted on the exterior shaft of said shaft assembly and said hollow quill shaft is connected to the other of said shafts, said hollow quill shaft extending into said hollow blade.

7. A heat exchanger-mixer in accordance with claim 5 wherein said weir is pivotally connected to the interior of said trough, weir positioning means connected to said weir and capable of moving said weir to a position whereby said material being processed is discharged under said weir to said discharging outlet.

8. A heat exchanger-mixer in accordance with claim 5 including radially extending fingers mounted on said shaft assembly radially aligned with said discharge outlet, said fingers having a radial extension sufficient to aid material in said discharge outlet to be continuously discharged through said outlet.

9. A heat exchanger-mixer in accordance with claim 5 wherein said blades of said discontinuous screw comprise two sets, each of said sets having blades arranged in a helix, said helixes being offset 180° from each other.

10. A heat exchanger-mixer for indirectly treating material comprising an elongated trough having an inlet for charging the trough with material to be treated and an outlet for discharging treated material from said trough, a double hollow shaft assembly comprising a hollow shaft extending longitudinally of said trough and rotatably supported therein, another hollow shaft mounted within said first shaft to define an annular space between said shafts, a plurality of heat transfer assemblies each comprising a radially extending hollow blade connected to one of said shafts and in communication with the interior thereof and a hollow quill shaft extending into said hollow blade, connected to the other of said shafts and in communication with the interior thereof, said assemblies providing thereby parallel heat-transfer fluid paths connecting the interiors of said shafts through said assemblies, each of said blades mounted perpendicular to said shafts and angularly set with respect to a plane perpendicular to the longitudinal axis of said shafts so as to form a discontinuous screw between said charging inlet and said discharging outlet, a weir in said trough transverse to said shafts, adjacent said discharge outlet and mounted with respect to said discharge outlet to cause said material being processed to form a continuously agitated bed of material in heat exchange relationship with the fluid in said hollow blades, a rabbling paddle mounted on said shaft assembly on the discharge side of said weir, said rabbling paddle having a pitch in a direction opposite the pitch of said blades so that when said mixer is in operation, material will be moved in a direction by said paddle, opposite to the direction of movement of the material as it is being treated.

11. A heat exchanger-mixer for indirectly treating material comprising a horizontally disposed, elongated trough having an inlet for charging the trough with material to be treated and an outlet for discharging treating material from said trough, said trough having a lower portion substantially semi-circular in cross section, a double hollow shaft assembly comprising a hollow shaft extending longitudinally of said trough and rotatably supported at either end of said trough, another hollow shaft coaxial with said first shaft and mounted therein to define an annular space between said shafts, a plurality of heat transfer assemblies each comprising a radially extending hollow blade connected to one of said shafts and in communication with the interior thereof and a hollow quill shaft extending into said hollow blade, connected to the other of said shafts and in communication with the interior thereof, said assemblies providing thereby parallel heat-transfer fluid paths connecting the interiors of said shafts through said assemblies, each of said blades mounted perpendicular to said double hollow shaft assembly and angularly set with respect to a plane perpendicular to the longitudinal axis of said shafts so as to form a discontinuous screw between said charging inlet and said discharging outlet, said blades of said discontinuous screw being angularly spaced in circumferentially overlapping relation and disposed with their root portions on a helix about said shaft, said hollow blades having an arcuate outer edge adapted to sweep adjacent said cylindrical surface during rotation of the shaft assembly in said trough, a weir in said trough transverse to said shafts, adjacent said discharge outlet and mounted with respect to said discharge outlet to cause said material being processed to form a continuously agitated bed of material in heat exchange relationship with the fluid in said hollow blades, a rabbling paddle mounted on said shaft assembly on the discharge side of said weir, said rabbling paddle having a pitch in a direction opposite the pitch of said blades so that when said mixer is in operation, material will be moved in a direction by said paddle, opposite to the direction of movement of the material as it is being treated.

12. A heat exchanger-mixer for indirectly treating material comprising a horizontally disposed, elongated trough having an inlet for charging the trough with material to be treated and an outlet for discharging treating material from said trough, said trough having a lower portion substantially semi-circular in cross section, a double hollow shaft assembly comprising a hollow shaft extending longitudinally of said trough and rotatably supported at either end of said trough, another hollow shaft coaxial with said first shaft and mounted therein to define an annular space between said shafts, a plurality of heat transfer assemblies each comprising a radially extending hollow blade connected to one of said shafts and in communication with the interior thereof and a hollow quill shaft extending into said hollow blade, connected to the other of said shafts and in communication with the interior thereof, said assemblies providing thereby parallel heat-tranfer fluid paths connecting the interiors of said shafts through said assemblies, each of said blades mounted perpendicular to said double hollow shaft assembly and angularly set with respect to a plane perpendicular to the longitudinal axis of said shafts so as to form a discontinuous screw between said charging inlet and said discharging outlet, blades of said discontinuous screw being angularly spaced in circumferentially overlapping relation and disposed with their root portions on a helix about said shaft, said hollow blades having an arcuate outer edge adapted to sweep adjacent said cylindrical surface during rotation of the shaft assembly in said trough, a weir in said trough transverse to said shafts, adjacent said discharge outlet and mounted with respect to said discharge outlet to cause said material being processed to form a continuously agitated bed of material in heat exchange relationship with the fluid in said hollow blades, a radially extending lifting paddle mounted on said shaft assembly adjacent said weir whereby movement of said material over said weir is aided.

References Cited by the Examiner

UNITED STATES PATENTS

| | | | |
|---|---|---|---|
| 978,468 | 12/1910 | Merritt | 61—25 |
| 1,556,230 | 10/1925 | Lisk | 165—88 |
| 1,617,815 | 2/1927 | Lissauer et al. | 165—88 |
| 2,798,693 | 7/1957 | Bojner | 165—88 |
| 3,020,025 | 2/1962 | O'Mara | 165—87 |

ROBERT A. O'LEARY, *Primary Examiner.*

T. W. STREULE, JR., *Assistant Examiner.*

UNITED STATES PATENT OFFICE
CERTIFICATE OF CORRECTION

Patent No. 3,285,330                                November 15, 1966

William L. Root 3rd.

It is hereby certified that error appears in the above numbered patent requiring correction and that the said Letters Patent should read as corrected below.

Column 6, line 34, for claim reference numeral "5" read -- 4 --.

Signed and sealed this 12th day of September 1967.

(SEAL)
Attest:

ERNEST W. SWIDER                                EDWARD J. BRENNER
Attesting Officer                                    Commissioner of Patents